(12) United States Patent
Chakraborty et al.

(10) Patent No.: US 8,825,102 B2
(45) Date of Patent: Sep. 2, 2014

(54) TRANSMIT POWER MANAGEMENT FOR SPECIFIC ABSORPTION RATES

(75) Inventors: Soumen Chakraborty, Bangalore (IN); Rishi Ranjan, Foster City, CA (US); Kamlesh Rath, San Ramon, CA (US); Manish Airy, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 371 days.

(21) Appl. No.: 13/238,809

(22) Filed: Sep. 21, 2011

(65) Prior Publication Data

US 2012/0071195 A1 Mar. 22, 2012

Related U.S. Application Data

(60) Provisional application No. 61/384,761, filed on Sep. 21, 2010.

(51) Int. Cl.
| | |
|---|---|
| *H04W 52/04* | (2009.01) |
| *H04B 1/38* | (2006.01) |
| *H04W 52/22* | (2009.01) |
| *H04W 52/36* | (2009.01) |
| *H04W 52/18* | (2009.01) |
| *H04W 52/34* | (2009.01) |
| *H01Q 1/24* | (2006.01) |

(52) U.S. Cl.
CPC ........... *H04B 1/3838* (2013.01); *H04W 52/228* (2013.01); *H04W 52/367* (2013.01); *H04W 52/18* (2013.01); *H04W 52/346* (2013.01); *Y02B 60/50* (2013.01); *H01Q 1/245* (2013.01)
USPC .................... 455/522; 455/67.11; 455/452.1; 455/115.1

(58) Field of Classification Search
CPC .. H04B 1/3838; H04B 1/0343; H04B 1/0346; H04B 5/0043
USPC ............... 455/69, 522, 41.2, 569.1, 515, 500, 455/575, 575.5, 115.1, 550.1, 127.1, 300, 455/301, 418, 404.1, 456.1, 90, 425, 550
See application file for complete search history.

(56) References Cited

U.S. PATENT DOCUMENTS

| | | | |
|---|---|---|---|
| 4,899,387 A * | 2/1990 | Pass .......................... | 381/71.13 |
| 6,600,929 B1 * | 7/2003 | Toncich et al. ............... | 455/522 |

(Continued)

OTHER PUBLICATIONS

International Search Report and Written Opinion for International Application No. PCT/US2011/052582, U.S. Patent and Trademark Office, mailed on Mar. 7, 2012 (11 pages).

*Primary Examiner* — Tan Trinh
(74) *Attorney, Agent, or Firm* — Sterne, Kessler, Goldstein & Fox P.L.L.C.

(57) ABSTRACT

Systems and methods for regulating transmit power in a mobile station to comply with SAR limits are disclosed. A mobile station may include a processor, transmitter, and proximity sensor. The transmitter is configured to operate at a transmit power controlled by a first transmit power limit. The proximity sensor identifies how close the mobile station is to a human head. A transmit power regulator, implemented on the processor, determines the cumulative energy radiated by the transmitter over a specified number of frames. If the cumulative energy exceeds an energy limit based on a SAR limit, and the proximity sensor indicates that the mobile station is close to a human head, the transmit power regulator may decrease the transmit power limit of the transmitter.

20 Claims, 2 Drawing Sheets

(56) References Cited

U.S. PATENT DOCUMENTS

| | | | |
|---|---|---|---|
| 7,167,718 B2* | 1/2007 | Hayashi et al. | 455/522 |
| 7,499,722 B2* | 3/2009 | McDowell et al. | 455/522 |
| 7,548,203 B2 | 6/2009 | Kalliola et al. | |
| 7,606,590 B2* | 10/2009 | Karabinis | 455/522 |
| 2002/0016155 A1* | 2/2002 | Charbonnier | 455/90 |
| 2003/0032461 A1* | 2/2003 | Desrosiers | 455/569 |
| 2003/0228875 A1* | 12/2003 | Alapuranen | 455/522 |
| 2005/0075123 A1* | 4/2005 | Jin et al. | 455/522 |
| 2005/0113691 A1* | 5/2005 | Liebschner | 600/437 |
| 2005/0239404 A1* | 10/2005 | Karabinis | 455/12.1 |
| 2008/0143315 A1* | 6/2008 | Bickel | 324/76.12 |
| 2009/0180522 A1* | 7/2009 | Sesia et al. | 375/148 |
| 2009/0280748 A1* | 11/2009 | Shan et al. | 455/67.11 |
| 2010/0203862 A1* | 8/2010 | Friedlander et al. | 455/404.1 |
| 2011/0294488 A1* | 12/2011 | Jin et al. | 455/418 |
| 2012/0046063 A1* | 2/2012 | Chande et al. | 455/522 |
| 2012/0142392 A1* | 6/2012 | Patel et al. | 455/522 |
| 2012/0271104 A1* | 10/2012 | Khait et al. | 600/109 |
| 2013/0196723 A1* | 8/2013 | Friedlander et al. | 455/575.5 |

* cited by examiner

TRANSMIT POWER MANAGEMENT FOR SPECIFIC ABSORPTION RATES

CROSS REFERENCE TO RELATED APPLICATIONS

This application claims the benefit of U.S. Provisional Application No. 61/384,761 filed Sep. 21, 2010, which is hereby incorporated by reference in its entirety.

BACKGROUND

1. Field of the Invention

This invention relates to transmit power management in a mobile station.

2. Background Art

The specific absorption rate (SAR) is a measure of a rate at which a human body absorbs energy when exposed to a radio frequency (RF) field. RF fields are created by many common devices, including mobile stations such as cellular telephones. The specific absorption rate measures the power absorbed per mass of tissue, and is typically measured in watts per kilogram (W/kg). The SAR may be averaged over the whole body, or over a small sample volume, such as 1 g of tissue.

Various regulatory bodies, such as the Federal Communications Commission (FCC) in the United States, and the European Committee for Electrotechnical Standardization (CENELEC) in the European Union, establish specific absorption rate limits for exposure to RF energy close to the human head. For example, the FCC requires that any mobile phones have a SAR level at or below 1.6 W/kg over a mass of 1 g of tissue. Similarly, CENELEC requires that mobile phones have a SAR level at or below 2 W/kg over a mass of 10 g of tissue.

The SAR of a device is typically tested using an anthropomorphic mannequin head that simulates a human head. Testing is performed by placing the device at various positions on both sides of the phantom head and measuring the SAR at each position. Further, testing is typically performed at the maximum transmit power of the device under test. For devices that do not transmit continuously, SAR testing averages duty cycles to determine the SAR of the device.

BRIEF SUMMARY

Disclosed herein are systems and methods for managing transmit power in a mobile station to comply with SAR limits. In accordance with one embodiment, a mobile station may include a transmitter, proximity sensor, and processor. The transmitter is configured to operate at a transmit power controlled by a first transmit power limit. The proximity sensor is configured to determine whether the mobile station is near a human head. A transmit power regulator, implemented on the processor, is configured to calculate a cumulative energy amount transmitted by the transmitter over a specified number of frames. The transmit power regulator determines whether the cumulative energy transmitted by the transmitter exceeds an energy limit. If the cumulative energy exceeds the energy limit, the transmit power regulator calculates a second transmit power limit, based on the difference between the cumulative energy amount and the energy limit, and a damping factor. The second transmit power limit is lower than the first transmit power limit. The transmit power regulator causes the transmitter to operate at a transmit power controlled by the second power limit when the proximity sensor determines that the mobile device is in close proximity to a human head.

In accordance with another embodiment, a method may include calculating the cumulative energy amount transmitted by a transmitter in a mobile station over a specified number of frames. The transmitter is operating at a previously set transmit power controlled by a first transmit power limit. A determination is made as to whether the cumulative energy is greater than an energy limit based on a SAR limit. If the cumulative energy is greater than the limit, a second transmit power limit is calculated, based on the difference between the cumulative energy amount and the energy limit, and a damping factor. The second transmit power limit is lower than the first transmit power limit. If a proximity sensor of the mobile station is activated, and the cumulative energy is greater than the energy limit, the transmitter is caused to operate at a transmit power controlled by the second transmit power limit.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Ensuring that a transmitter in a device complies with SAR limitations raises multiple issues. For example, transmission at the edge of a cell typically requires a transmitter to operate at a high transmit power. Transmitting data at a high data rate also requires that the transmitter operate at a high transmit power. The power at which a transmitter transmits signals from a mobile station, such as a cellular phone handset, or other device, directly affects the SAR of the mobile station, which must always comply with SAR limits when placed close to a human head. The power at which a transmitter transmits signals may be controlled by a transmit power limit.

One way to ensure compliance with SAR limits is to maintain the transmit power limit of a transmitter in a mobile station at a low level. However, if the transmit power limit is too low, a base station communicating with the mobile station may receive or report errors, and data transmission may not be reliable. Maximizing the transmit power limit of a transmitter may ensure that the radio link between the mobile station and the base station is reliable, as the transmitter may operate at a high transmit power. However, as explained above, maximizing the transmit power limit may have the effect of exceeding established SAR limits. Thus, in one embodiment, the transmit power limit of a transmitter is regulated to maximize the transmit power and optimize the performance of a radio link, while complying with SAR limits.

Figure 1:
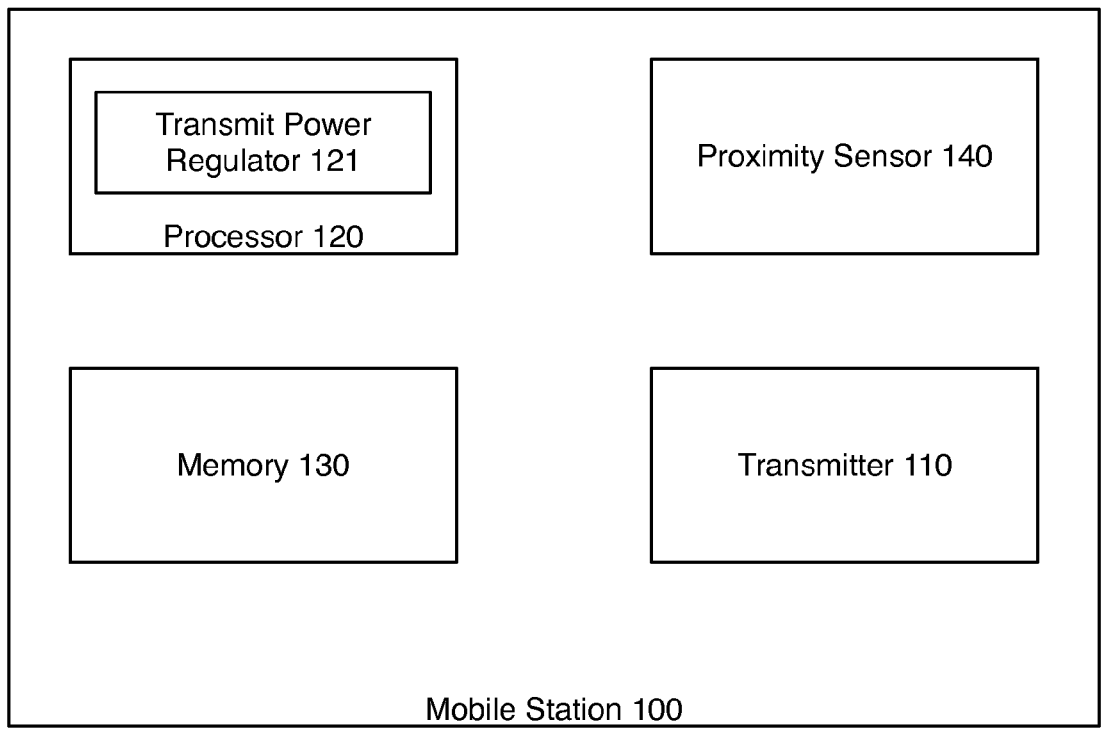
FIG. 1 is a diagram of a mobile station in accordance with an embodiment.

FIG. 1 is a diagram of a mobile station 100 in accordance with one embodiment. Mobile station 100 includes transmitter 110. In one embodiment, transmitter 110 may be a WiMAX transmitter operating in accordance with the IEEE 802.16 family of standards. In another embodiment, transmitter 110 may be an LTE or Long Term Evolution transmitter, 3G transmitter, 4G transmitter, or other type of transmitter. In one exemplary embodiment, a time division duplex configuration is used. Transmitter 110 may be coupled to one or more antennae. In one embodiment, mobile station 100 may include multiple transmitters 110. Transmitter 110 may be configured to operate at a transmit power controlled by a transmit power limit.

Mobile station 100 also includes processor 120. Processor 120 may be a general purpose or special purpose processor, and may be included as a component of transmitter 110. Mobile station 100 also includes memory 130, which may, in some embodiments, contain instructions to be executed by processor 120.

Mobile station 100 further includes proximity sensor 140. Proximity sensor 140 may be configured to determine the physical proximity of the mobile station 100 to a human body or a human head. For example, proximity sensor 140 may be an infrared, acoustic, capacitive, or inductive proximity sensor. In one embodiment, multiple proximity sensors are provided.

In accordance with one embodiment, processor 120 implements a transmit power regulator 121 to control the transmit power limit of transmitter 110. The transmit power regulator 121 may calculate a cumulative energy amount transmitted by the transmitter over a specified number of frames. The cumulative energy amount is compared against an energy limit based on established SAR limits and a margin factor. If the energy limit is exceeded, and if the mobile station is close to a human head, for example, as determined by the proximity sensor, the transmit power limit may be reduced to comply with SAR limits. In one embodiment, the amount to reduce the transmit power limit is based on a damping factor. In another embodiment, multiple proximity sensor can be used to control transmit energy of multiple antenna systems independently or jointly.

In one embodiment, the damping factor may be proportional to the number of frames over which the cumulative energy amount is calculated. This may ensure that transmit power limit or transmit power of the transmitter is not greatly or suddenly reduced to comply with SAR limits. Such drastic changes may affect data transmission, and may confuse a base station communicating with the transmitter. Drastic changes may also cause the base station to initiate corrections.

Figure 2:
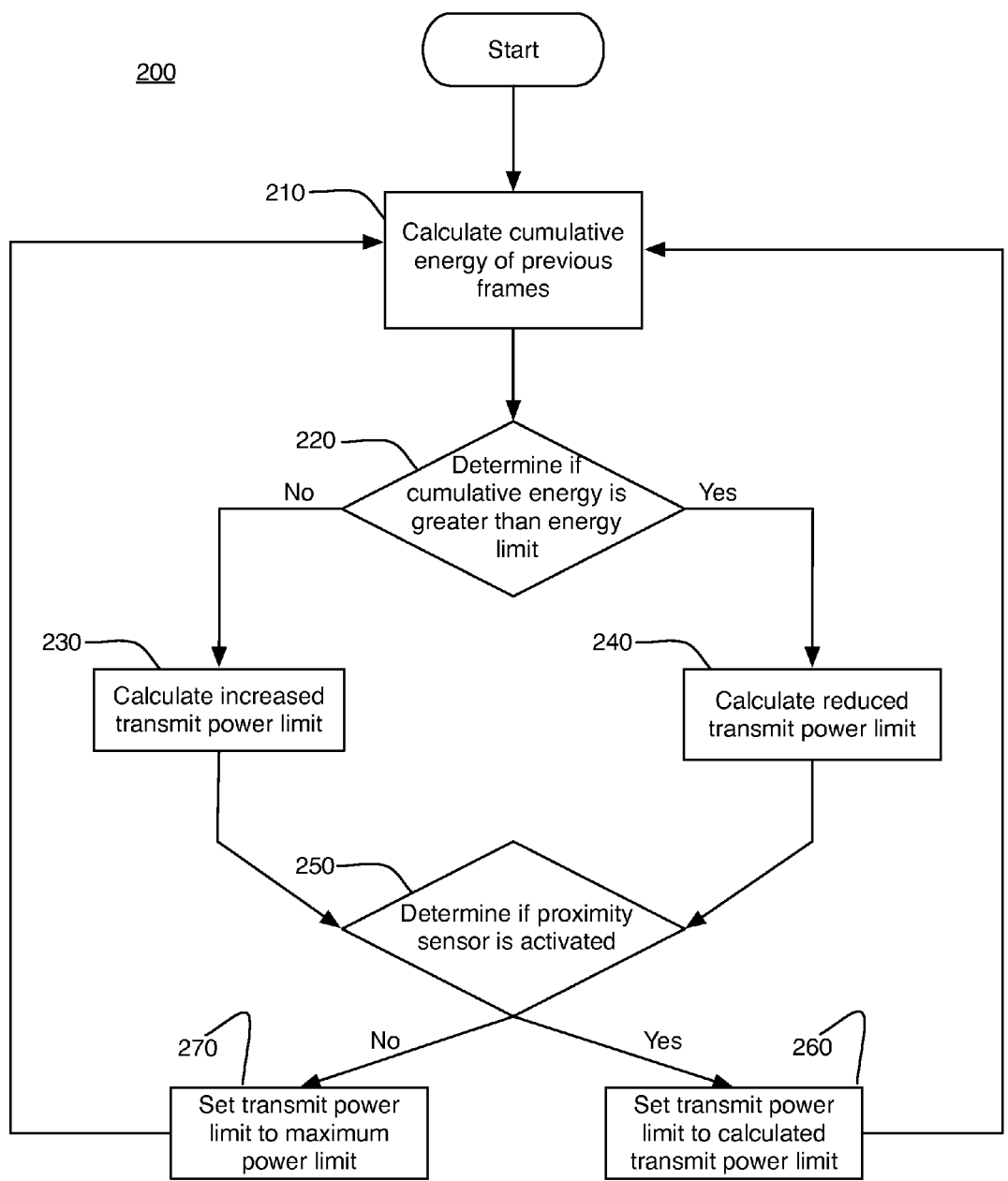
FIG. 2 is a flow diagram of a method in accordance with an embodiment.

FIG. 2 is a diagram of a method 200 for regulating the transmit power limit of a transmitter in a mobile station, in accordance with one embodiment. Individual stages of method 200 may be implemented by transmit power regulator 121, processor 120, and proximity sensor 140 of mobile station 100.

At stage 210, a cumulative energy amount transmitted by the transmitter over a specified number of frames is calculated. In one embodiment, the cumulative energy amount transmitted over 50 frames is calculated. The number of frames may be dependent on the SAR tests for a particular country or jurisdiction and the length of the frame. For example, a SAR test may determine the amount of radiation absorbed over 0.5 seconds. Each frame may be 10 milliseconds in length. In such a situation, the cumulative energy transmitted over 50 frames may be used for stage 210. In one embodiment, the number of frames is between 50 and 100. In another embodiment, the number of frames is determined by average aggregate energy limit over unit measurement time specified by SAR requirements.

At decision block 220, the cumulative energy amount determined at stage 210 is compared against an energy limit for the number of frames, based on established SAR limits. The energy limit used in decision block 220 may be based on an established SAR limit, multiplied by a margin.

If, at decision block 220, the cumulative energy amount calculated at stage 210 is less than the energy limit for that number of frames, method 200 proceeds to stage 230. At stage 230, an increased transmit power is calculated. The increased transmit power may be based on the difference between the cumulative energy amount and the energy limit, multiplied by a damping factor. The increased transmit power may be equal to this amount, plus the transmit power limit for the last frame. As described above, increasing the transmit power limit, and thereby the transmit power, of a transmitter may allow for a higher rate of data transmission or more reliable data transmission.

If, at decision block 220, the cumulative energy amount determined at stage 210 is greater than the energy limit for that number of frames, method 200 proceeds to stage 240. At stage 240, a reduced transmit power is calculated. The reduced transmit power may be based on the difference between the cumulative energy amount and the energy limit, multiplied by a damping factor. The reduced transmit power may be equal to the transmit power limit for the last frame minus this amount.

After stage 230 or 240, method 200 proceeds to decision block 250. At decision block 250, the output of the proximity sensor may be determined. If the proximity sensor is activated, meaning that the mobile station is determined to be close to a human head, method 200 proceeds to stage 260. If the proximity sensor is not activated, method 200 proceeds to stage 270.

At stage 260, because the mobile station is close to a human head, the transmit power limit for the next frame is changed to the transmit power limit calculated at stage 230 or 240. For example, if the cumulative energy amount calculated at stage 210 was greater than the energy limit, the transmit power limit for the next frame is reduced to the transmit power limit calculated at stage 230. Reducing the transmit power limit for the next frame may cause the cumulative energy amount for a subsequent specified number of frames to fall under the energy limit, and cause the device to be under established SAR limits. If the cumulative energy amount calculated at stage 210 was not greater than the energy limit, the transmit power limit for the next frame is increased to the transmit power limit calculated at stage 240.

If the proximity sensor is not activated, method 200 proceeds to stage 270. At stage 260, the transmit power limit is set to the maximum transmit power of the transmitter. Because the mobile station is not close to a human head, it does not need to comply with SAR limits, and the transmit power of the mobile station can be maximized.

After stage 250 or 260, method 200 repeats by returning to stage 210. In this way, the total energy radiated by the transmitter is always monitored and adjusted to comply with SAR limits.

Method 200 may be performed, in one embodiment, by a transmit power regulator 121 of a mobile device 100. Method 200 may be performed during each frame for a mobile device operating in a time-division duplexing configuration.

In an alternate embodiment, determining the output of the proximity sensor, as described with reference to decision block 250, may be performed after decision block 220 reports that the cumulative energy is greater than the energy limit. For example, after determining that the cumulative energy is greater than the energy limit, the output of the proximity sensor may be determined. If the proximity sensor is activated, a reduced transmit power limit is calculated in accordance with stage 240 of method 200. If the proximity sensor is not activated, the transmit power limit may be set to the maximum power limit in accordance with stage 270 of method 200.

Determining the cumulative energy amount transmitted over a specified number of frames, in accordance with stage 210 of method 200, incorporates both the uplink transmit power of the transmitter as well as the duty cycle of the uplink transmitter. That is, how often the transmitter is transmitting, or the allocation of the transmitter, is considered when determining whether SAR limits are exceeded and whether to increase or decrease the power limit of the transmitter.

As described above with reference to stage 240, the reduced transmit power limit may be based on the calculated cumulative energy and a damping factor. In one embodiment, the reduced transmit power limit is based on the transmit power of the last frame, the damping factor, the cumulative energy determined at stage 210, the SAR limit, and the SAR limit margin. The damping factor may gradually reduce the transmit power limit of the transmitter for the next frame, to ensure that the transmit power limit for the next frame is not greatly reduced. In one embodiment, the damping factor used to calculate a reduced transmit power limit is 2, divided by the number of frames used for the cumulative energy amount.

In one embodiment, if the transmit power limit must be reduced by a large amount in order to comply with SAR limits, the transmit power regulator may instruct the transmitter to stop transmitting for a period of time. For example, if the transmit power limit, measured in decibels, must be reduced over a threshold amount, for example, 3 dB, the transmit power regulator may instruct the transmitter to stop transmitting. This may prevent uplink errors or other undesirable effects from occurring. In one embodiment, if transmit power limit must be reduced over a threshold amount over a specified number of frames, the transmit power regulator may instruct the transmitter to stop transmitting. Thus, if the transmit power limit is to be reduced by a total over 3 dB over five frames, the transmit power regulator may instruct the transmitter to stop transmitting.

As described above with reference to stage 230, the transmit power limit of the transmitter may be increased if the cumulative energy does not exceed the energy limit. In one embodiment, the increased transmit power limit of the transmitter may be based on the transmit power limit of the previous frame, a damping factor for increasing transmit power limit, the SAR limit, and the SAR limit margin. The damping factor for increasing the transmit power limit may be different than the damping factor for decreasing the transmit power limit. The damping factor for increasing the transmit power limit may gradually increase the transmit power limit of the transmitter up to the maximum transmit power of the transmitter. Gradually increasing the transmit power limit may ensure that the increase in the transmit power limit does not cause the measured SAR of the transmitter to exceed the energy limit. In one embodiment, the damping factor for increasing transmit power limit may be 1, divided by the number of frames used for the cumulative energy amount.

In some embodiments, a mobile station may contain multiple transmitters. In such a mobile station, each transmitter may have an associated proximity sensor. A transmit power regulator may be implemented for each transmitter, and may determine a cumulative energy amount for each transmitter over a specified number of frames. If the cumulative energy amount for one transmitter has exceeded the energy limit for the number of frames, the transmit power regulator may cause the transmitter to reduce its transmit power limit, while not affecting the transmit power limit other transmitter. Or, the transmit power of each transmitter (and associated antenna) can be regulated jointly.

In some embodiments, transmission quality may not be compromised, as the transmit power limit of the transmitter is not reduced unless absolutely necessary to comply with SAR limits. Further, in some embodiments, stopping transmission, as described above, may prevent a waste of uplink or transmission capacity. In some embodiments, the determination to stop transmission is communicated to a base station. In other words, the base station is informed so that further transmissions can be halted to save system bandwidth and interference if transmission at optimum transmit power violates SAR requirements.

Although embodiments are described with reference to a mobile device or handset, embodiments may also be implemented in other devices incorporating elements of mobile device 100. For example, other handheld electronic devices, such as tablet computers, digital music players, or other devices that must comply with SAR limits, may implement method 200 to ensure that the energy transmitted by the device does not exceed SAR limits. Devices implementing embodiments disclosed herein may anticipate that SAR limits will be exceeded, and take corrective action before the limits can be exceeded. It is contemplated that the transmit power limit may be reduced to comply with SAR limits dependent on other parts of the body to which the transmitter may be near.

Embodiments may be directed to computer products comprising software stored on any computer usable medium. Such software, when executed in one or more data processing device, causes a data processing device(s) to operate as described herein. Embodiments may be implemented in hardware, software, firmware, or a combination thereof.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A mobile device, comprising:
a transmitter configured to operate at a transmit power controlled by a transmit power limit;
a proximity sensor configured to determine when the mobile device is in close proximity to a user of the mobile device;
a processor; and
a transmit power regulator configured to:
calculate a cumulative energy amount transmitted by the transmitter over a specified number of frames;
determine whether the cumulative energy amount exceeds an energy limit;
for each frame, in a series of frames, calculate a reduced transmit power limit when the cumulative energy amount exceeds the energy limit, wherein the reduced transmit power limit for each frame in the series of frames is based on a damping factor that gradually reduces the cumulative energy amount when the proximity sensor determines that the mobile device is in close proximity to the user of the mobile device.

2. The mobile device of claim 1, wherein the energy limit is based on a previously established specific absorption rate (SAR) limit.

3. The mobile device of claim 1, wherein the transmit power regulator is further configured to:
calculate an increased transmit power limit when the cumulative energy amount does not exceed the energy limit, wherein the increased transmit power limit for each frame in the series of frames is based on a damping factor that gradually increases the cumulative energy amount when the cumulative energy amount does not exceed the energy limit.

4. The mobile device of claim 1, wherein the transmit power regulator is further configured to:
cause the transmitter to operate at a transmit power controlled by a maximum power limit of the transmitter when the proximity sensor determines that the mobile device is not in close proximity to the user of the mobile device.

5. The mobile device of claim 1, wherein the transmit power regulator is further configured to:
determine that a difference between the reduced transmit power limit and the transmit power limit exceeds a threshold amount; and
cause the transmitter to stop transmission.

6. The mobile device of claim 1, wherein the specified number of frames is determined by averaging aggregate energy limit over unit measurement time specified by specific absorption rate (SAR) requirements.

7. The mobile device of claim 1, further comprising a second proximity sensor, wherein the transmit power regulator is configured to control transmit energy of multiple antennas.

8. The mobile device of claim 1, wherein the transmit power regulator is configured to calculate the damping factor based on the specified number of frames.

9. The mobile device of claim 1, wherein the transmit power regulator is configured to gradually reduce the reduced transmit power based on the damping factor multiplied with a difference between the cumulative energy amount and the energy limit.

10. A method, comprising:
calculating a cumulative energy amount transmitted by a transmitter in a mobile station over a specified number of frames, wherein the transmitter operates at a transmit power controlled by a transmit power limit;
determining whether the cumulative energy amount exceeds an energy limit; and
determining if the mobile station is in close proximity to a user of the mobile device;
calculating for each frame, in a series of frames, a reduced transmit power limit, when the cumulative energy amount exceeds the energy limit, wherein the reduced transmit power limit for each frame in the series of frames is based on a damning factor that gradually reduces the cumulative energy amount when the mobile station is in close proximity to the user of the mobile device and when the cumulative energy amount exceeds the energy limit.

11. The method of claim 10, wherein the energy limit is based on a previously established energy limit as specified by specific absorption rate (SAR) requirements.

12. The method of claim 10, further comprising:
calculating an increased transmit power limit when the cumulative energy amount does not exceed the energy limit, wherein the increased transmit power limit for each frame in the series of frames is based on a damping factor that gradually increases the cumulative energy amount when the cumulative energy amount does not exceed the energy limit.

13. The method of claim 10, further comprising:
causing the transmitter to operate at a transmit power controlled by a maximum power limit of the transmitter when a proximity sensor determines that the mobile station is not in close proximity to the user of the mobile device.

14. The method of claim 10, further comprising:
determining that a difference between the reduced transmit power limit and the transmit power limit exceeds a threshold amount; and
causing the transmitter to stop transmission.

15. The method of claim 10, wherein the specified number of frames is determined by averaging aggregate energy limit over unit measurement time specified by specific absorption rate (SAR) requirements.

16. The method of claim 10, wherein a duty cycle of an uplink transmission is used to calculate the cumulative energy amount transmitted.

17. The method of claim 10, further comprising modifying an uplink transmission to regulate the cumulative energy amount transmitted.

18. The method of claim 10, further comprising informing a base station about halting further transmissions.

19. The method of claim 10, wherein calculating the damping factor is based on the specified number of frames.

20. The method of claim 10, wherein calculating the reduced transmit power is based on the damping factor multiplied with a difference between the cumulative energy amount and the energy limit.

* * * * *

UNITED STATES PATENT AND TRADEMARK OFFICE
CERTIFICATE OF CORRECTION

PATENT NO. : 8,825,102 B2  
APPLICATION NO. : 13/238809  
DATED : September 2, 2014  
INVENTOR(S) : Chakraborty et al.

Page 1 of 1

It is certified that error appears in the above-identified patent and that said Letters Patent is hereby corrected as shown below:

In the Claims,

In column 8, line 31, please replace "damning" with --damping--.

Signed and Sealed this
Thirtieth Day of December, 2014

Michelle K. Lee
*Deputy Director of the United States Patent and Trademark Office*